(12) United States Patent
Bloch et al.

(10) Patent No.: US 7,267,897 B2
(45) Date of Patent: Sep. 11, 2007

(54) FUEL CELL FOR POWERING ELECTRONIC APPLIANCES, IN PARTICULAR PORTABLE OBJECTS

(75) Inventors: Didier Bloch, Biviers (FR); Gilles Delapierre, Seyssins (FR); Thierry Priem, Seyssinet Pariset (FR); Didier Marsacq, Grenoble (FR); Jean-Yves Laurent, Claix (FR); Corinne Gauthier, Vert le Petit (FR); Christian Perut, Saint Fargeau (FR)

(73) Assignee: Commissariat a l'Energie Atomique, Paris (FR)

( * ) Notice: Subject to any disclaimer, the term of this patent is extended or adjusted under 35 U.S.C. 154(b) by 658 days.

(21) Appl. No.: 10/450,058

(22) PCT Filed: Dec. 20, 2001

(86) PCT No.: PCT/FR01/04092

§ 371 (c)(1),
(2), (4) Date: Jul. 9, 2003

(87) PCT Pub. No.: WO02/052666

PCT Pub. Date: Jul. 4, 2002

(65) Prior Publication Data

US 2004/0067396 A1 Apr. 8, 2004

(30) Foreign Application Priority Data

Dec. 22, 2000 (FR) .................................. 00 16941

(51) Int. Cl.
*H01M 8/00* (2006.01)
(52) U.S. Cl. ............................................. 429/17; 13/22
(58) Field of Classification Search .................... 429/7, 429/8, 12, 13, 19, 20, 22, 24
See application file for complete search history.

(56) References Cited

U.S. PATENT DOCUMENTS 4,193,388 A * 3/1980 Frosch et al. .......... 126/263.01

* cited by examiner

*Primary Examiner*—Patrick Joseph Ryan
*Assistant Examiner*—Monique Wills
(74) *Attorney, Agent, or Firm*—Oliff & Berridge, PLC

(57) ABSTRACT

The fuel cell (2) is of the kind comprising an anode (12) and a cathode (10) between which an electrolyte (18) is interposed. Solid bodies (20) storing a hydrogen mass, able to be decomposed by combustion, are associated to pyrotechnic means (24,26) to release the hydrogen and bring it into contact with the anode (12). Means (38) tap the ambient air to bring it into contact with the cathode (10). Firing of the pyrotechnic means (24,26) is placed under the control of addressing means (28) embedded in the appliance (2). The surplus water produced by the exchange between the hydrogen and the oxygen is resorbed by the temperature increase induced by combustion of the bodies (20). The solid bodies (20) are supported by an interchangeable card (22).

17 Claims, 3 Drawing Sheets

FUEL CELL FOR POWERING ELECTRONIC APPLIANCES, IN PARTICULAR PORTABLE OBJECTS

BACKGROUND OF THE INVENTION

The invention relates to the field of autonomous devices for providing electrical power. The object of the invention is to achieve such a device, that is consumable, for portable electronic appliances, for example mobile phones or such like, or equipment with an electronic memory or the like.

It relates more particularly to a consumable device for providing electrical power designed for a portable electronic appliance and comprising a fuel cell comprising an electrolyte arranged between an anode and a cathode, means for storing hydrogen, means for conveying the stored hydrogen to the anode, means for tapping ambient air and for bringing the tapped air into contact with the cathode, means for controlling release of the hydrogen and means for neutralizing the surplus water produced by the cell.

STATE OF THE TECHNIQUE

One of the objectives of designers of portable electronic appliances resides in the light nature and small dimensions of these appliances, in particular in order to make the latter easy to transport and to handle. This objective must in particular take into account the problem posed by the power supply means, normally constituted by a relatively heavy and bulky rechargeable battery. It is in fact apparent that increasing the autonomy time of the equipment involves increasing the size and weight of these means. This results in designers being subjected to the constraint of having to find a compromise between the autonomy time of the equipment and the space and weight set aside for the battery. It should be noted that this compromise also has to take the recharging time of the battery into account, which constitutes a constraint for the user.

Prior art designers have therefore tended to concentrate their efforts on batteries, such as lithium batteries, providing the longest possible autonomy for a small size and weight. It should however be noted that charging these batteries remains a long operation and requires the use of a removable accessory, or charger; this accessory imposes an additional constraint since the user has to keep it close at hand, otherwise he will be unable to recharge the battery.

According to another approach to the problem to be solved, it has been proposed to equip portable electronic appliances with consumable power supply means such as non-rechargeable batteries. However, this solution presents the drawback of involving prohibitive operating costs of the electronic appliance. Furthermore, the disposable nature of these means, which comprise toxic materials, also gives rise to inopportune waste treatment costs.

Fuel cells for autonomous production of electrical power are further known. These fuel cells associate electrodes (anode and cathode) with a fuel in hydrogen form which is brought into contact with a combustion agent in the form of oxygen by means of an electrolyte. Conditioning the hydrogen used for these fuel cells gives rise to a problem. According to a first proposed solution, the fuel cells function by electrolysis of water to obtain the hydrogen and oxygen necessary for their operation. According to other solutions, hydrogen is formed by plasma reforming of gas or methanol. This results in these fuel cells being difficult to transpose for power supply of portable electronic appliances, wherein they have to be embedded, due either to a difficulty in matching the water reserve and the appliance or to an incompatibility between the hydrogen production or storage means and the constraints proper to portable appliances.

The documents EP-A-788,172 and GB-A-2,164,637 disclose the use of a metallic hydride as hydrogen storage element.

OBJECT OF THE INVENTION

The general object of the present invention is to propose a solution to the above-mentioned problem of size and weight of the electrical power supply means of a portable electronic appliance.

This objective is achieved by a device according to claim 1.

Going beyond this general objective, and starting off from an initial inventive approach whereto the present invention relates, the invention also more specifically has the object:
a) of proposing an autonomous device for supplying electrical power to an electronic appliance, whose periods of power delivery to the appliance are limited to the periods useful for the latter,
b) of proposing consumable means for supplying electrical power to an electronic appliance that are light, of small dimensions, and easily treatable as waste,
c) of proposing a fuel cell whose structure is suitable for being embedded in and for use by electronic appliances.

The inventive approach of the present invention consists in a general manner in proposing to produce electrical power from an embedded fuel cell, to supply a portable electronic appliance in particular. The fuel cell proposed by the present invention comprises the features whereby the hydrogen is contained in at least one body made of a solid material able to be decomposed by combustion, whereas the oxygen is taken from the ambient air by means for tapping this air.

The hydrogen is releasable by pyrotechnic means that cause firing of the solid material with a view to decomposition thereof. It should be noted that these pyrotechnic means are associated to control means for implementation thereof.

According to another feature of the invention, there are preferably provided a plurality of solid bodies, each one being independent from the other, connected to a respective firing means that the pyrotechnic means comprise. These arrangements are such that the global quantity of hydrogen contained in the device is progressively released by distinct firing of the different solid bodies. According to this feature of the invention, the control means comprise in particular means for addressing the firing means that are associated to activating means. Implementation of the latter means is advantageously placed under the control of means for measuring the quantity of power available for the appliance. Delivery of power for the appliance takes place when a minimum available power threshold is detected and/or when an operation to be performed by the appliance requires power to be supplied.

It should be noted that in the preferred case where there are a plurality of solid bodies, the latter can each contain the same quantity of hydrogen, or respective quantities of hydrogen. The advantage can be noted in the latter case of enabling hydrogen to be delivered in a quantity suitable for a punctual requirement, by firing of a specific body ordered by the addressing means advantageously placed under the control of the means for measuring the quantity of power available for the appliance.

The residual water surplus to requirements that is produced in the course of the electrochemical reaction between the hydrogen and oxygen is neutralized by resorption means. These means advantageously comprise the above-mentioned pyrotechnic means, in that they cause a temperature rise causing evaporation of the water produced. It should be noted that these resorption means are if necessary accessorily completed by means for absorbing the water produced, such as a porous or alveolar body. It can thus be noted that the arrangements of the invention enable spontaneous use of the residual water for operation of the combustion cell of the invention, the surplus being neutralized. This spontaneous use resides in particular in keeping the electrodes and electrolyte in a moist environment and in protecting the appliance from a too large heat increase. It should also be noted that these arrangements improve the efficiency of the combustion cell of the invention.

The means for tapping the ambient air are preferably means causing a flow of the air surrounding the device, such as by suction and/or discharge, through an oxygen chamber one of the walls whereof is at least partially formed by the cathode. These arrangements are such that the cathode is placed in contact with the ambient air and more particularly with the oxygen contained by the latter.

In the embodiment wherein the tapping means are ambient air flow means, the latter in addition advantageously at least partly constitute the above-mentioned water resorption means, in so far as they cause a current for conveying this water, evaporated or not, to means for removing the water from the device, and/or accessorily to the above-mentioned absorption means. It should also be noted that these ambient air flow means enable an inopportune temperature rise to be prevented.

The solid body containing the hydrogen is for its part housed inside at least one compartment. According to the preferred embodiment wherein a plurality of solid bodies are provided, the latter are housed, according to different variants, either in a respective compartment or in a global compartment, or if applicable in compartments housing the bodies by respective groups depending on the quantity of hydrogen they respectively contain. This compartment opens out into an expansion chamber for the released hydrogen, one of the walls whereof is at least partially formed by the anode.

The proton exchange between the anode and the cathode takes place by means of an electrolyte interposed between these two elements. The electrodes are made to come into contact with conjugate connection means of the appliance to be supplied. The appliance can, according to various alternative embodiments, either have the power supplied available directly or be equipped with buffer means for storing the power supplied by the fuel cell, in order to regulate use of this power by the appliance. These buffer means are in particular arranged between the fuel cell and the electronic means of the appliance provided for power supply thereof. It must be understood that in the latter case, the buffer power storage capacity of these means is as such low in comparison with that of the similar means equipping portable electronic appliances of the prior art.

It should be noted that these buffer power storage means are advantageously associated to the above-mentioned means for measuring the quantity of power available for the appliance.

To return to a general structural definition of the present invention, the proposed device is a consumable device for supply of electrical power for a portable electronic appliance. This device is mainly constituted by a fuel cell comprising:

a) at least one anode and at least one cathode between which there is interposed an electrolyte which is assigned thereto per couple,
b) at least one solid body storing a hydrogen mass, this body being able to be decomposed by combustion,
c) means for tapping the ambient air surrounding the support and for bringing the tapped air into contact with the cathode,
d) pyrotechnic means for firing the body to release the hydrogen and bring it into contact with the anode,
e) means for commanding firing of the pyrotechnic means,
f) means for neutralizing the water produced by the exchange between the hydrogen and the oxygen,
g) means for bringing the electrodes and the power supply circuit of the appliance into contact with one another.

This results in the portable electronic appliance being supplied with electric power in complete safety for the appliance and its user from an autonomous and consumable power production source.

According to an important feature of the present invention, there is preferably provided a plurality of solid bodies. The pyrotechnic means comprise a corresponding plurality of firing means assigned to a respective body. The control means comprise means for addressing the plurality of firing means associated to activating means of the latter. It should be noted that by means of these arrangements, it is envisageable to advantageously place implementation of the activating means under the control of means for measuring the quantity of power available for the appliance.

It should however be noted that this implementation can, independently or in combination, advantageously be controlled on demand by the user by means in particular of a corresponding manual control means.

According to another feature of the invention relating to a convenience of use of the device, the solid body is housed in the thickness of an interchangeable support, in particular flat such as in the form of a card. It should however be noted that the shape of the support can be taken advantage of to improve the efficiency and/or capacity of the fuel cell of the invention. This card is advantageously in the format of an ordinary credit card (with a surface of about 46 sq. cm for a thickness of about one millimeter). This card is interchangeable to enable it to be replaced when the hydrogen reserve has been used up. It can be understood that the different elements, means and chambers of the device, with the exception of the support of the solid body, are advantageously embedded in the appliance to be powered. However, it should be noted that according to another possible alternative embodiment, and without departing from the general rule of the invention as described, all the means of the device of the invention can be embedded in a globally interchangeable support. In this case, the means for bringing the electrodes into contact with the distribution circuit proper to the appliance are formed by means for connecting the electrodes to the corresponding means of the appliance. These connecting means, and means for connecting the pyrotechnic means to the control means should these be necessary, are then emergent from the support.

The invention, according to another approach, therefore also relates to a hydrogen reserve for a combustion cell, comprising an interchangeable support advantageously in the form of a card. This support forms a receptacle for at least one solid body for storage of a hydrogen mass, this body being able to be decomposed by combustion and emerging from the support, for the purposes notably of enabling expansion of the hydrogen released inside an expansion chamber situated inside the appliance to be powered. This support comprises in addition:

a) at least one firing means assigned to the body,
b) activating means for activating the firing means,
c) easily reversible means for mechanical connection to the appliance to be powered.

It should be noted that the assembly between the support and the appliance is tight, the appliance or alternatively the support comprising for example tightness means to confine the support inside the hydrogen expansion chamber arranged in the appliance.

With relation to the above-mentioned preferred embodiments, the support comprises in addition connecting means operating in conjunction with conjugate connecting means of the appliance to be powered to bring the activating means into contact with the control means, or the addressing means, embedded in the appliance. It can be noted that these connecting means and the above-mentioned means for mechanical connection of the support to the appliance are advantageously the same means.

It should be noted that the electrolyte is for example a polymer membrane, such as Nafion (Dupont de Nemours registered trademark). As for the electrodes, they are for example formed from a carbon-based material.

According to another approach of the invention, the latter also relates to a fuel cell as such. Indeed, unlike usual practice in this field, the hydrogen is provided not by electrolysis of a water reserve or from a reserve of material under pressure for example, but from solid bodies able to be decomposed by combustion. This fuel cell can therefore be recognized in general in that the hydrogen is stored inside at least one solid body able to be decomposed by combustion, the fuel cell comprising pyrotechnic means for firing the body to release the hydrogen into an expansion chamber in contact with the anode. The oxygen is for its part taken from the ambient air by means for tapping this air and for bringing the tapped air into contact with the cathode.

Due to these arrangements, the fuel cell is viable in complete safety for an application for supply of electrical power to a portable electronic appliance, both on account of the fact that there is hardly any water present and of the secured storage of the hydrogen reserve.

BRIEF DESCRIPTION OF THE DRAWINGS

The present invention will be better understood and details relating thereto will become more clearly apparent from the following description of preferred embodiments with reference to the figures of the accompanying drawings in which.

DESCRIPTION OF A PREFERRED EMBODIMENT

Figure 1:
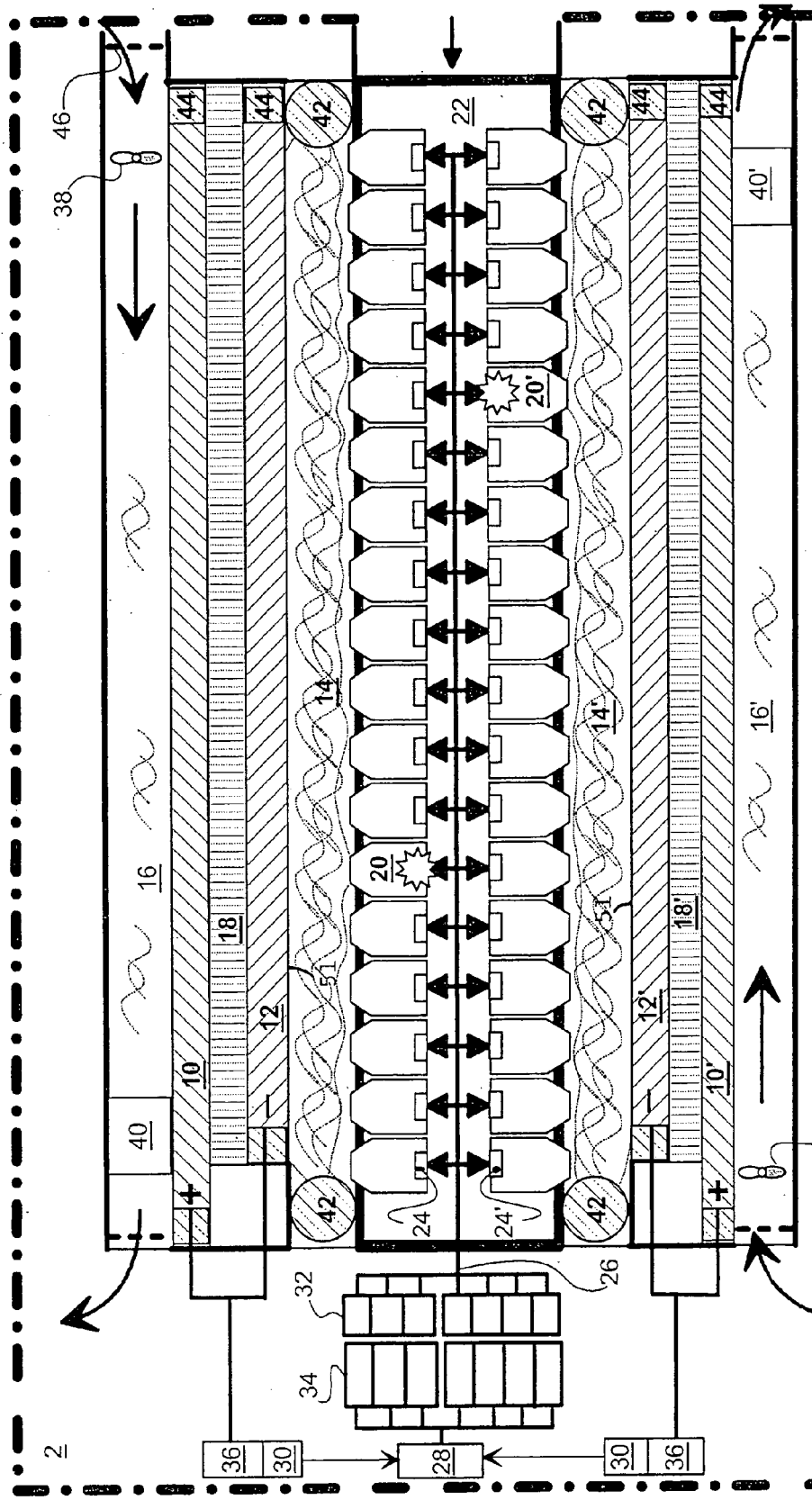
FIGS. 1 to 3 are schematic representations of devices according to respective alternative embodiments of the invention.

In the figures, a fuel cell designed to equip a portable electronic apparatus 2 can be seen. At least one anode 12,12' is in contact with the internal volume of a hydrogen expansion chamber 14,14' whereas at least one cathode 10,10' is in contact with the internal volume of an air flow chamber 16,16' that contains oxygen. At least one electrolyte 18,18' is interposed between each anode and cathode couple 10,12 and 10',12'.

A set of solid hydrogen storage bodies such as 20,20' are arranged in a middle zone forming a compartment 22.

Ignition means 24,24' are assigned to each of these bodies 20,20' for selective combustion thereof by activating means 26 controlled by addressing means 28. These addressing means 28, comprised in the electronic means of the appliance 2 to be powered, are themselves placed under the control of means 30 for measuring the power available for the appliance.

The solid hydrogen storage bodies 20,20' release gaseous hydrogen by slow combustion. They may be formed by a pyrotechnic material releasing hydrogen by combustion when it is activated.

It can be noted that the connecting means 32 related to the pyrotechnic means 24,26,28 are provided to operate in conjunction with conjugate connecting means 34 of the appliance 2 to be powered. It can also be noted that the appliance 2 accessorily comprises a buffer power reserve 36 interposed between the appliance 2 and the fuel cell of the invention to regulate the power supplied to the appliance in operation.

Moreover, the cell of the invention comprises means 38,38' for tapping ambient air and for bringing this air into the oxygen chambers 16,16'. These means 38,38' are for example means causing a natural air flow inside these chambers 16,16', such as by venturi effect. Filtering grates 46 prevent undesirable particles from getting in.

The surplus water produced by the exchange between the hydrogen and oxygen and not used by the device is resorbed by evaporation. This evaporation is caused by the temperature rise resulting from combustion of the bodies 20,20' and from the heat given off by the electrochemical reaction. The water vapor is expelled from the fuel cell by the tapped ambient air flow means 38,38'. It should be noted that the water absorption can be completed by absorbent means, such as 40,40'.

Figure 2:
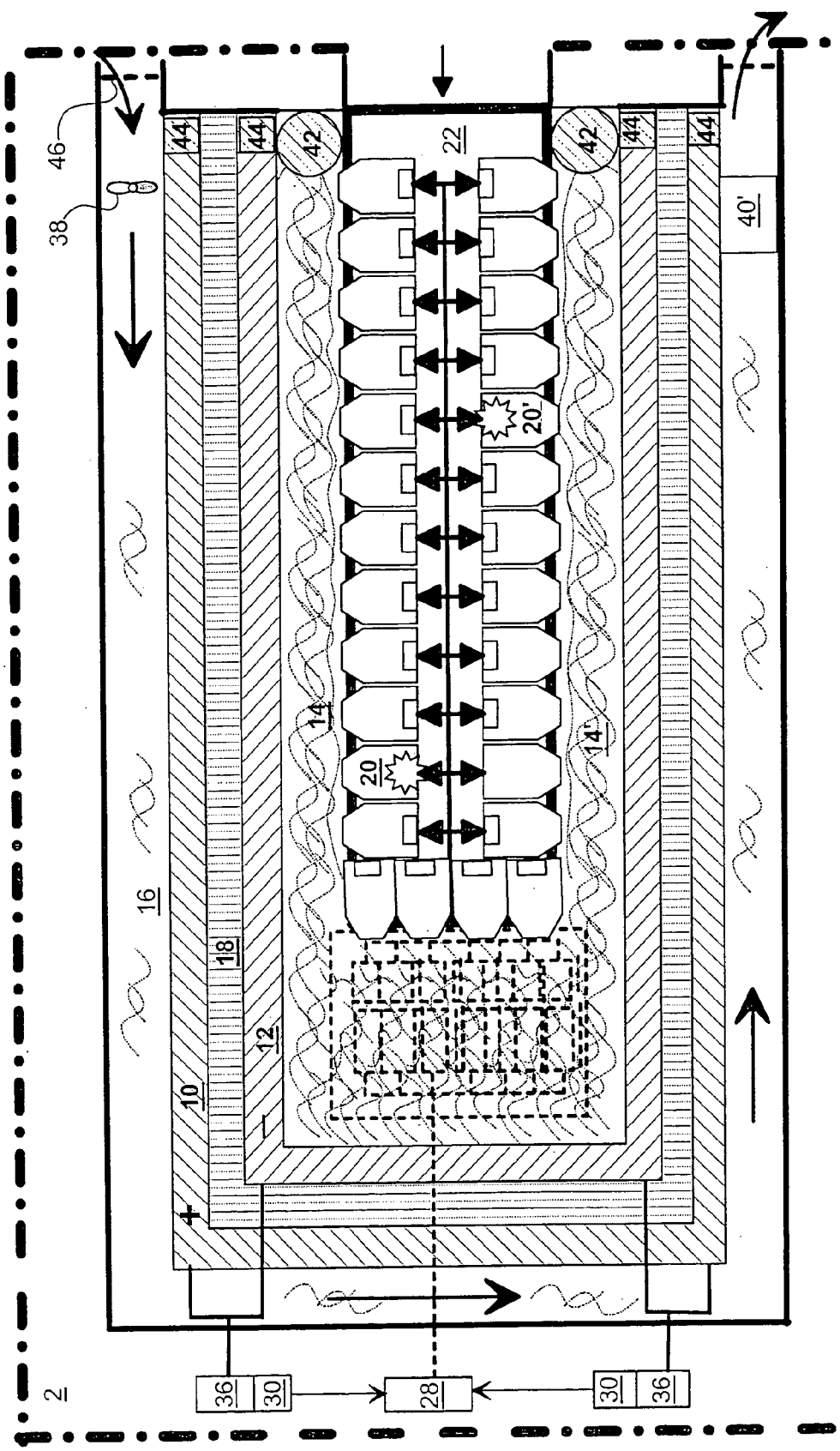
Figure 3:
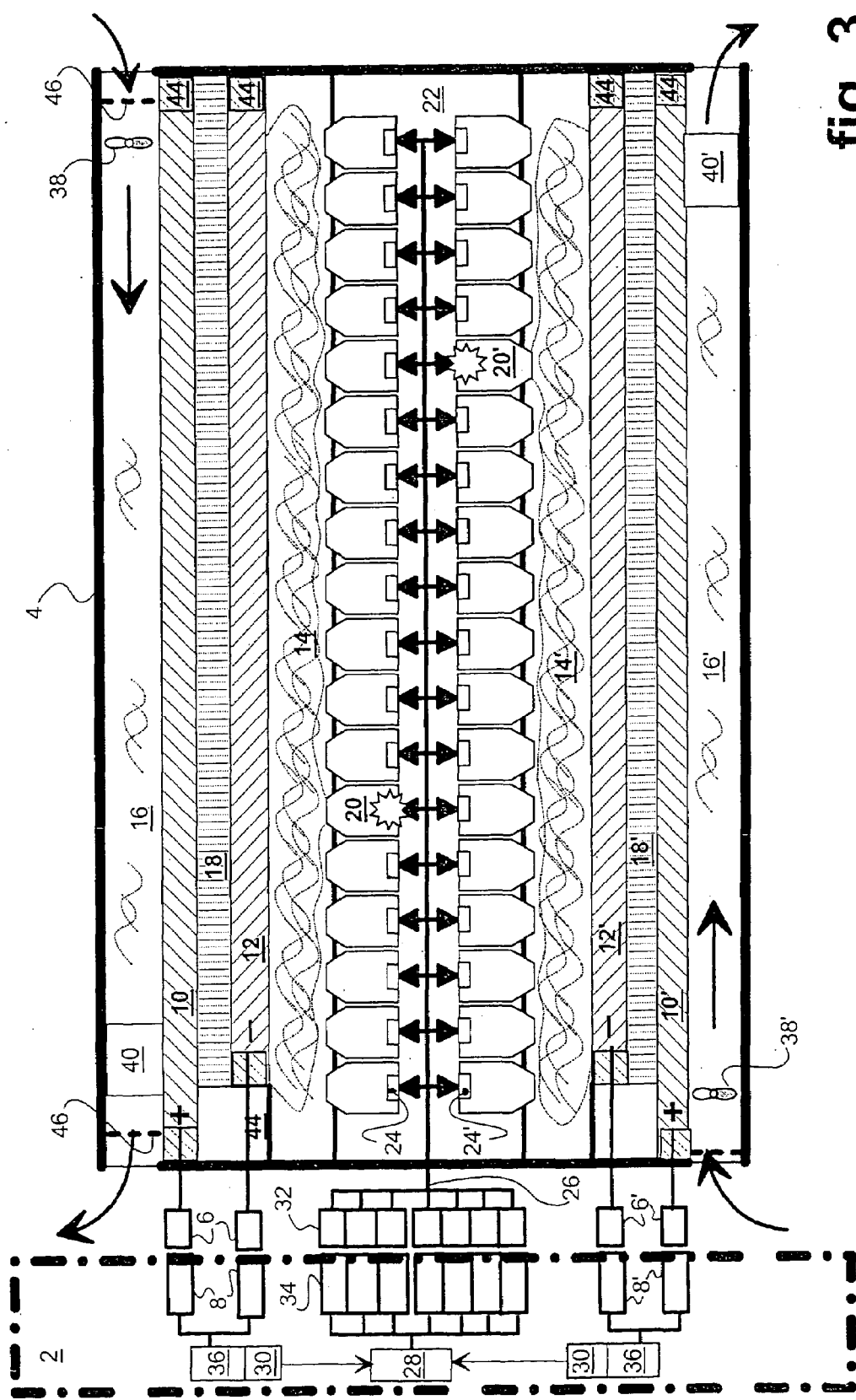

In the alternative embodiment illustrated in FIG. 3, all the means of the fuel cell are supported by a common removable support 4. In the preferred embodiments illustrated in FIG. 1 and FIG. 2, only the hydrogen reserve is supported by a removable support 22, the rest of the means of the device of the invention being embedded in the appliance 2.

In FIG. 1 and FIG. 2, the appliance comprises a housing for tightly receiving the support 22 of the solid bodies 20. Tightness is achieved for example by means of seals, such as 42 or 44, which are in particular interposed between the support 22 and the appliance 2, and at the ends of the electrodes 10,10' and 12,12'. It can be understood that the support, which corresponds to the compartment 22, forms a receptacle for the solid bodies 20 that emerge therefrom. This support 22 is presented in the form of a flat support having the shape of a commonplace credit card.

According to the embodiments of the support 22 illustrated in these figures, this support has a volume of about 3.5 to 4 sq. cm. Such a support, on account of the inert packaging and sectoring materials, enables a quantity of solid hydrogen storage material of about 0.4 grams to be housed. This results in a potential quantity of releasable hydrogen of about 0.052 grams, enabling 0.53 Wh of electrical power to be delivered. Such a delivery corresponds, for a cellphone for example, to a time of use of about two hours of conversation under nominal operating conditions.

A selective membrane 51 is associated to the anode 12,12' and is formed by a material enabling the solid hydrogen storage bodies 20,20' to be isolated from humidity while allowing $H_2$ to pass.

In FIG. 3, connection means 6,6' emerge from the support 4 to operate in conjunction with similar connection means 8,8' equipping the appliance 2 for supply of power thereto.

The invention claimed is:

1. A consumable device for providing electrical power, designed for a portable electronic appliance, comprising:
   a fuel cell comprising an electrolyte arranged between an anode and a cathode,
   means for storing hydrogen,
   means for conveying the stored hydrogen to the anode,
   means for tapping ambient air and for bringing the tapped air into contact with the cathode,
   means for controlling release of the hydrogen, and
   means for neutralizing the surplus water produced by the cell, wherein:
   the means for storing hydrogen comprises at least one solid body comprising a material that releases gaseous hydrogen during combustion after ignition of the solid body by pyrotechnic means.

2. Device according to claim 1, wherein the material constituting the solid body is a pyrotechnic material.

3. Device according to claim 1 comprising a plurality of solid bodies, wherein the pyrotechnic means comprise firing means assigned to a respective body, the control means comprising means for addressing the firing means associated to activating means of the latter.

4. Device according to claim 3, wherein implementation of the activating means is placed under the control of means for measuring the quantity of power available for the appliance.

5. Device according to claim 3, comprising buffer means for storing the power supplied by the fuel cell, arranged between the latter and the electronic means of the appliance.

6. Device according to claim 1, wherein the means for tapping ambient air are means for causing the air to flow through an oxygen chamber, one of the walls whereof is at least partially formed by the cathode.

7. Device according to claim 1, wherein the solid body is housed in a compartment opening out into an expansion chamber for the released hydrogen, one of the walls whereof is at least partially formed by the anode.

8. Device according to claim 1, wherein the means for neutralizing the surplus water produced by the exchange between the hydrogen and the oxygen are resorption means.

9. Device according to claim 6, wherein the resorption means comprise any one of the ambient air flow means and means for absorbing the water produced.

10. Device according to claim 1, wherein the solid body is housed in the thickness of an interchangeable support, the different elements, means and chambers of the device, with the exception of the support of the solid body, being embedded in the appliance to be powered.

11. Device according to claim 1, wherein the electrolyte is a polymer membrane, the electrodes being formed from a carbon-based material.

12. Fuel cell of a device according to claim 1, said fuel cell being associated to electrodes (anode and cathode), with a fuel in the form of hydrogen, which is brought into contact by means of an electrolyte with a combustion agent in the form of oxygen, wherein:
   the hydrogen is stored inside at least one solid body able to be decomposed by combustion, the fuel cell comprising pyrotechnic means for firing the body to release the hydrogen into an expansion chamber in contact with the anode, and the oxygen is tapped from the ambient air by means for tapping this air and for bringing the tapped air into contact with the cathode.

13. Application of a fuel cell according to claim 12 to supply of electrical power to a portable electronic appliance.

14. Hydrogen reserve for a fuel cell according to claim 12, comprising.
   an interchangeable support forming a receptacle for at least one solid body, the solid body comprising a material that releases gaseous hydrogen during combustion after ignition of the solid body and emerging from the support to enable expansion of the hydrogen released inside an expansion chamber situated inside the appliance to be powered, wherein:
   the support further comprising:
     at least one firing means assigned to the body,
     activating means for activating the firing means, and
     easily reversible means for mechanical connection to the appliance to be powered.

15. Hydrogen reserve for a fuel cell according to claim 14, wherein the support further comprises connecting means operating in conjunction with conjugate connecting means of the appliance to bring the activating means into contact with the control and addressing means embedded in the appliance.

16. Hydrogen reserve for a fuel cell according to claim 14, wherein the connecting means and the means for mechanical connection of the support to the appliance are the same means.

17. Device according to claim 1, wherein a selective membrane is associated to the anode and is formed by a material enabling the solid hydrogen storage bodies to be isolated from humidity while allowing hydrogen to pass.

* * * * *